United States Patent Office 3,329,713
Patented July 4, 1967

3,329,713
PYROLYSIS OF 2,2,4-TRIMETHYL-1,3-PENTANE-
DIOL MONOISOBUTYRATE
Vinton A. Hoyle, Jr., and Ray E. Leonard, Kingsport,
Tenn., assignors to Eastman Kodak Company, Rochester, N.Y., a corporation of New Jersey
No Drawing. Filed June 14, 1965, Ser. No. 463,864
2 Claims. (Cl. 260—540)

This invention relates to the preparation of 2,2,4-trimethylpent-3-en-1-ol and, more particularly, it relates to the preparation of that compound by the vapor phase pyrolysis of 2,2,4-trimethyl - 1,3 - pentanediol monoisobutyrate.

The product of this invention, 2,2,4-trimethylpent-3-en-1-ol is a valuable chemical intermediate which can be used for many purposes, among which is in the manufacture of 2,2,4-trimethylpentanol, and accordingly it is important to provide an economical process for its manufacture. Furthermore, certain other valuable chemicals are produced as by-products of this process; namely, isobutyric acid, diisopropyl ketone, isobutyraldehyde, and formaldehyde. Although 2,2,4-trimethylpent-3-en-1-ol has been prepared in the past by other processes, it is a distinct advantage to be able to start with a commercially available chemical compound and to employ an economic process for converting it to the desired product.

It is an object of this invention to provide a process for the preparation of 2,2,4-trimethylpent-3-en-1-ol. It is another object of this invention to provide a vapor phase pyrolysis process for preparing 2,2,4-trimethylpent-3-en-1-ol. It is still another object of this invention to provide a convenient process for the preparation of 2,2,4-trimethylpent-3-en-1-ol as the principal product, and at the same time to produce as by-products isobutyric acid and diisopropyl ketone. Still other objects will appear from the more detailed description of this invention which follows.

The foregoing objects are accomplished in accordance with this invention by providing a process in which 2,2,4-trimethyl-1,3-pentanediol monoisobutyrate is pyrolyzed at a temperature of 350°–500° C. to produce a product mixture containing 2,2,4-trimethylpent-3-en-1-ol. In the preferred embodiment of this invention the starting material, a mixture of the isomers 2,2,4-trimethyl-1,3-pentanediol-1-isobutyrate and 2,2,4-trimethyl-1,3-pentanediol-3-isobutyrate, is passed through a packed, tubular reactor and pyrolyzed therein at a temperature of 400°–450° C. to produce as a product a mixture of 2,2,4-trimethylpent-3-en-1-ol and at least one member of the group consisting of isobutyric acid, diisopropyl ketone, isobutyraldehyde, and formaldehyde.

The starting material for the process of this invention is the isobutyric acid monoester of 2,2,4-trimethyl-1,3-pentanediol. Esterification may, of course, take place either at the 1-position or at the 3-position, and it is intended that the term 2,2,4-trimethyl-1,3-pentanediol monoisobutyrate, whenever used in the description of this invention, will include both isomers in all proportions. A typical commercial product which can be employed as the starting material of this invention is a mixture of approximately 60% by weight of 2,2,4-trimethyl-1,3-pentanediol-1-isobutyrate, 40% by weight of 2,2,4-trimethyl-1,3-pentanediol-3-isobutyrate. It is to be understood, however, that either isomer, whether alone or in any proportioned mixture with the other isomer, is suitable as the starting material for this invention.

It was unexpected to find that even when the starting material contained a substantial amount of both isobutyrate isomers, the product alcohol inevitably had the hydroxyl group in the 1-position and the unsaturation in the 3-position. It is believed that this is the result of two decomposition reactions, one of which converts 2,2,4-trimethyl-1,3-pentanediol-3-isobutyrate to 2,2,4 - trimethyl-pent-3-en-1-ol and isobutyric acid:

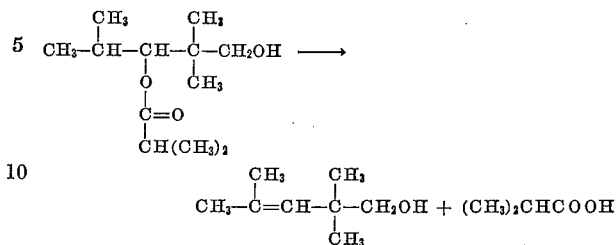

and the other of which converts 2,2,4-trimethyl-1,3-pentanediol-1-isobutyrate to diisopropyl ketone, formaldehyde, and isobutyraldehyde.

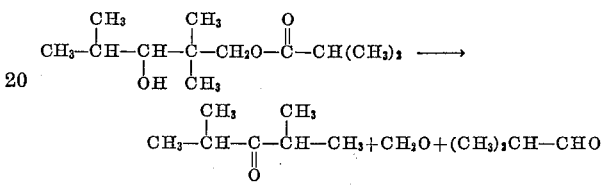

It has been found that there is a certain amount of molecular rearrangement at temperatures below the pyrolysis temperature, wherein one isomeric form of the isobutyrate starting material is rearranged to the other isomeric form, and the equilibrium of this rearrangement may assist in favoring the production of 2,2,4-trimethylpent-3-en-1-ol.

The process is generally accomplished by passing the isobutyrate esters through a pyrolysis zone at a temperature of 350°–500° C., preferably 400°–450° C., collecting the vaporous product, and separating it into its various components. The pyrolysis zone may comprise any type of reactor although a simple tubular reactor is adequate. The tubular reactor may be unpacked, or it may be packed with various types and shapes of inert material which provide intimate mixing of the vapors passing through the reactor. Suitable packing materials include "Vycor" chips, alumina, steel, etc. Other processing conditions such as pressure, reaction time, throughput, etc. may be varied to suit the conditions required for any particular process. In general longer reaction times and higher temperatures produce a greater conversion of ester to the product alcohol and the various by-products.

A better understanding of this invention may be had by reference to the following illustrative examples which are intended to show the operation of certain embodiments of this invention. Parts and percentages are by weight and temperatures are in degrees centigrade unless otherwise specified.

*Example 1*

A pyrolysis reactor was prepared by placing 33 inches of a 25 mm. outside diameter "Vycor" tubing in an electric furnace fitted with an iron block liner to provide uniform heat distribution. The temperature was controlled automatically by a multi-point control unit. Temperatures inside the reactor were measured by means of a movable thermocouple inserted in a 9 mm. outside diameter thermowell coaxially located along the length of the reactor. The reactor head was designed to permit simultaneous feeding of gas and liquid materials. The reactor was fed with a liquid starting material under a pressure of nitrogen. The outlet end of the reactor was fitted with a receiver, cooled by chilled water, into which vaporous products were condensed and collected.

The reactor was packed with 110 ml. of 4 x 8 mesh "Vycor" chips and the entire packed reactor was heated to 430° C. and held at this temperature throughout the run.

Nitrogen gas was fed into the reactor at a rate of 60 ml. per minute and 2,2,4-trimethyl-1,3-pentanediol monoisobutyrate was fed into the reactor at a rate of 0.865 ml. per minute. A total of 425 g. of the monoisobutyrate ester (approximately 60% by weight 1-isobutyrate isomer and 40% by weight 3-isobutyrate isomer) was fed into the reactor and a total of 421 g. of pyrolysis product was recovered. The product had the following composition: 8.1% by weight diisopropyl ketone, 19.3% by weight 2,2,4-trimethylpent-3-en-1-ol, 54.2% of 2,2,4-trimethyl-1,3-pentanediol monoisobutyrate, and 12.5% by weight of isobutyric acid. Isobutyraldehyde and formaldehyde were both present in the product in small amounts.

*Example 2*

The pyrolysis reactor described in Example 1 was heated to 400° C. and held at this temperature for the entire run. Nitrogen was fed into the inlet end of the reactor at a rate of 60 ml. per minute, and the monoisobutyrate ester of Example 1 was fed into the reactor for a total of 85 g. over a period of 180.5 minutes. The pyrolysis product in the amount of 83.1 g. had the following assay: 6.6% by weight diisopropyl ketone, 8.2% by weight 2,2,4-trimethylpent-3-en-1-ol, 78% 2,2,4-trimethyl-1,3-pentanediol monoisobutyrate, and 5.7% by weight isobutyric acid. Formaldehyde and isobutyraldehyde were both present in the product in small amounts.

*Example 3*

The reactor described in Example 1 was heated to a temperature of 450° C. and held at this temperature throughout the entire run. The nitrogen was fed into the inlet end of the reactor at a rate of 60 ml. per minute and the monoisobutyrate ester of Example 1 was fed to the reactor in a total amount of 84.5 g. over a period of 102 minutes. The pyrolysis product, in the amount of 83.7 g. had the following assay: 13.7% by weight diisopropyl ketone, 19.9% by weight 2,2,4-trimethylpent-3-en-1-ol, 29.3% by weight 2,2,4-trimethyl-1,3-pentanediol monoisobutyrate, and 13.7% by weight isobutyric acid. Formaldehyde and isobutyraldehyde were both present in the product.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A process for preparing 2,2,4-trimethylpent-3-en-1-ol which comprises pyrolyzing a mixture of 2,2,4-trimethyl-1,3-pentanediol-1-isobutyrate and 2,2,4-trimethyl-1,3-pentanediol-3-isobutyrate at a temperature of 350°–500° C. and recovering a product mixture comprising 2,2,4-trimethylpent-3-en-1-ol, isobutyric acid, and diisopropyl ketone.

2. The process of claim 1 in which the pyrolysis is accomplished by passing vapors of the starting materials through a packed tubular reactor at a temperature of 400°–450° C.

References Cited

UNITED STATES PATENTS 2,941,011   6/1960   Hagemeyer et al. _____ 260—593

LORRAINE A. WEINBERGER, *Primary Examiner.*

VIVIAN GARNER, *Assistant Examiner.*